April 1, 1924.
G. A. ARMINGTON
TROLLEY
Filed July 10, 1922
1,489,104
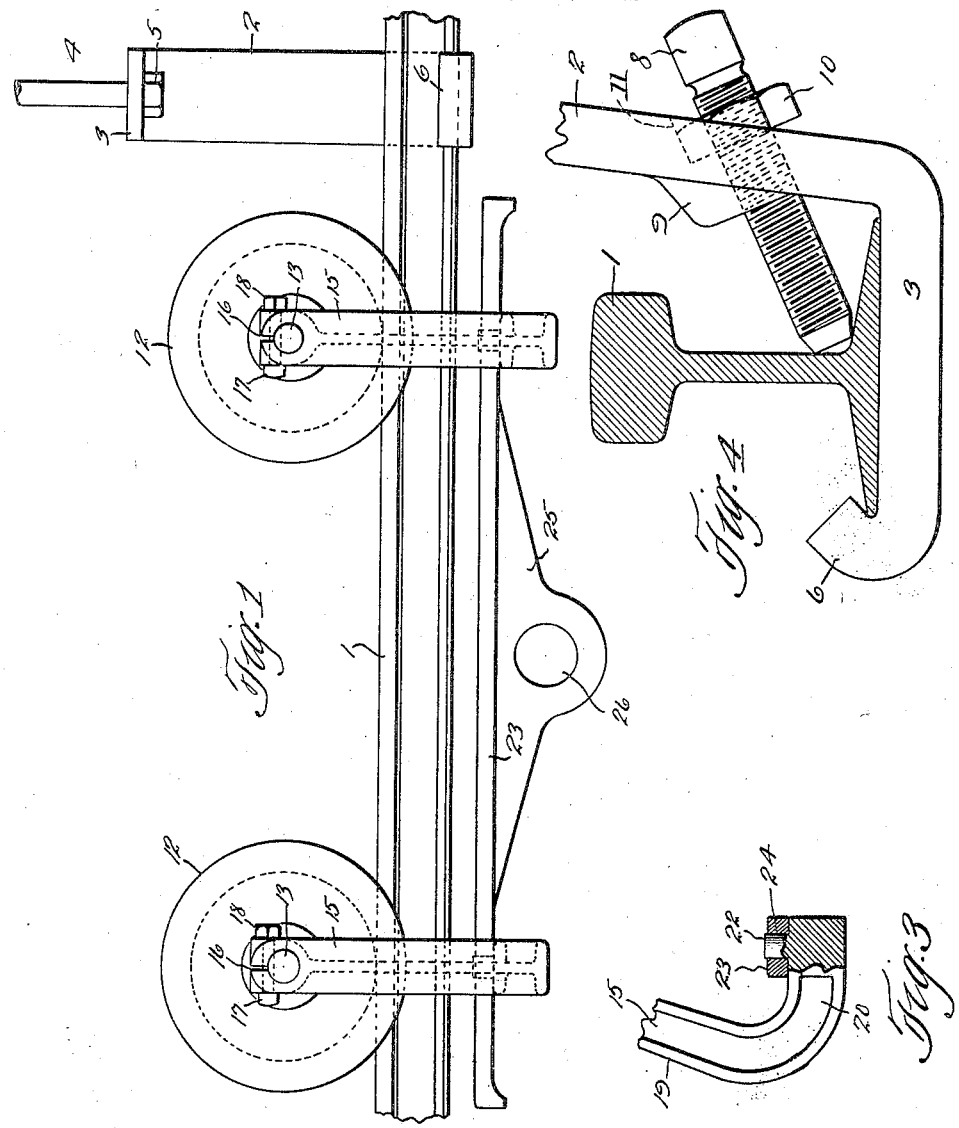
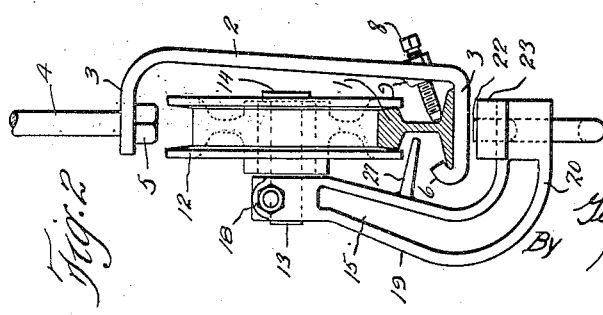
Inventor
George A. Armington
By Hull, Brock & West
Attys.

Patented Apr. 1, 1924.

1,489,104

UNITED STATES PATENT OFFICE.

GEORGE A. ARMINGTON, OF WICKLIFFE, OHIO, ASSIGNOR TO THE ARMINGTON ENGINEERING COMPANY, OF EUCLID, OHIO, A CORPORATION OF OHIO.

TROLLEY.

Application filed July 10, 1922. Serial No. 574,061.

*To all whom it may concern:*

Be it known that I, GEORGE A. ARMINGTON, a citizen of the United States, residing at Wickliffe, in the county of Lake and State of Ohio, have invented a certain new and useful Improvement in Trolleys, of which the following is a full, clear, and exact description, reference being had to the accompanying drawings.

This invention relates to trolleys and has for its objects to provide a trolley which shall consist of few parts which are simple in construction and inexpensive to manufacture; to provide a trolley which shall employ a standard T rail as the supporting rail over which the trolley moves; to provide means for retaining the trolley on the rail when not in use, such means being so arranged, however, as to permit the trolley to be readily removed from the rail when desired; to provide a trolley of the aforesaid character which shall be rugged in construction and efficient in operation, while further objects and advantages will appear as the description proceeds.

In the accompanying drawing wherein I have shown one form of my invention, Fig. 1 is a side elevation of my trolley; Fig. 2 is an end elevation thereof; Fig. 3 is a detail fragmentary view partly in elevation and partly in section showing the connection between the load supporting bar and one of the trolley arms; and Fig. 4 is an enlarged detail sectional view showing the manner of fastening the T rail in one of the brackets therefor.

Describing by reference characters the various parts illustrated, 1 denotes a standard T rail which is supported by a plurality of brackets 2, each of which has the end portions thereof bent over as indicated at 3. One of said bent-over portions is provided with an aperture therethrough to receive the end of a depending rod 4 to which a nut 5 is applied, and the other of said bent-over portions has the end thereof bent upon itself as indicated at 6 to form a stop projection for the base flange of the T rail. A bolt 8 is threaded through an angularly disposed boss 9 formed in bracket 2 and this bolt is adapted to contact with the T rail to force said rail against the projection 6. A lock nut 10, threaded on bolt 8 and positioned in a recessed seat 11 which is formed in bracket 2, prevents bolt 8 from working loose.

The trolley carriage is composed of a pair of flanged wheels 12, 12 spaced apart and each journaled on a stub shaft 13. One end of each stub shaft is formed with a head 14 and the opposite end thereof is adjustably clamped in an arm 15, the end whereof is split as indicated at 16 and a bolt 17 extending therethrough and having a nut 18 threaded thereon serves to clamp the shaft in adjusted position. Arms 15, which may be in the form of castings, are directed outwardly as indicated at 19 and then inwardly as indicated at 20 and the inner end of each arm is formed with an upstanding projection 22 which is disposed in vertical axial alignment with rod 4 and rail 1. A horizontally disposed bar 23 is provided adjacent each end with an aperture 24 which receives the projections 22 and retains the trolley units in spaced relation. This bar projects slightly beyond each wheel 12 and serves as a bumper to prevent damage to the flanges of said wheels when the trolley is moved to either end of the rail. The under side of bar 23 is formed with a web 25 which is provided with an aperture 26 for the reception of suitable attaching means for a hoist or the load to be attached.

When a load is attached to bar 23 the trolley will ride in a vertical position, as shown in Figs. 1 and 2, due to the vertical axial alignment of projections 20 with rail 1. When the load is released, however, there is a tendency for the trolley to rotate in a counter clockwise direction as viewed in Fig. 2 due to the weight of the outwardly directed portions 19 of arms 15. In order to limit the rotation of the trolley I preferably form each arm 15 with an inwardly directed plate 27, the inner end whereof is disposed between the head and base flange of the T rail 1. When the trolley is unloaded and tends to rotate as described above, these plates will contact with the vertical web of the T rail and prevent the trolley from leaving the rail.

If it is desired to remove the trolley from the supporting rail, this may be easily accomplished by first removing bar 23 and then rotating each trolley unit until a position is reached which permits the unit to be lifted upwardly away from the rail.